United States Patent
Buhler et al.

(10) Patent No.: US 10,267,161 B2
(45) Date of Patent: Apr. 23, 2019

(54) GAS TURBINE ENGINE WITH FILLET FILM HOLES

(71) Applicant: General Electric Company, Schenectady, NY (US)

(72) Inventors: Jared Peter Buhler, Tewksbury, MA (US); Ronald Scott Bunker, West Chester, OH (US); Victor Hugo Silva Correia, Milton Mills, NH (US); Brian Kenneth Corsetti, Lynn, MA (US)

(73) Assignee: General Electric Company, Schenectady, NY (US)

( * ) Notice: Subject to any disclaimer, the term of this patent is extended or adjusted under 35 U.S.C. 154(b) by 572 days.

(21) Appl. No.: 14/960,924

(22) Filed: Dec. 7, 2015

(65) Prior Publication Data

US 2017/0159449 A1    Jun. 8, 2017

(51) Int. Cl.
*F01D 5/18* (2006.01)

(52) U.S. Cl.
CPC .............. *F01D 5/186* (2013.01); *F01D 5/188* (2013.01); *F05D 2260/202* (2013.01); *Y02T 50/676* (2013.01)

(58) Field of Classification Search
None
See application file for complete search history.

(56) References Cited

U.S. PATENT DOCUMENTS

| | | |
|---|---|---|
| 4,770,608 A | 9/1988 | Anderson et al. |
| 5,688,104 A | 11/1997 | Beabout |
| 6,368,060 B1 * | 4/2002 | Fehrenbach ............ F01D 5/186 416/97 A |
| 6,554,563 B2 * | 4/2003 | Noe ........................ F01D 5/189 415/115 |
| 7,249,933 B2 | 7/2007 | Lee et al. |

(Continued)

FOREIGN PATENT DOCUMENTS

| | | |
|---|---|---|
| CN | 101852099 A | 10/2010 |
| EP | 2685048 A1 | 1/2014 |

(Continued)

OTHER PUBLICATIONS

Extended European Search Report and Opinion issued in connection with corresponding EP Application No. 6201692.7 dated May 22, 2017.

(Continued)

*Primary Examiner* — Christopher Verdier
*Assistant Examiner* — Jason G Davis
(74) *Attorney, Agent, or Firm* — General Electric Company; Kristi L. Davidson

(57) ABSTRACT

An airfoil for a gas turbine engine can have an exterior wall and an interior wall, with each wall having a thickness. The walls can intersect to define a corner at the intersection. A cooling passage can be defined by the walls at or near the corner to provide fluid communication between the interior and exterior of the airfoil. A film hole can be disposed in the walls and can have a length and diameter to define a ratio of length to diameter, L/D. An arcuate fillet can be located in the corner to define an effective radius for the fillet. The effective radius can be at least 1.5 times larger than the thicknesses of the walls to provide for an increased length to diameter ratio for the film hole.

26 Claims, 9 Drawing Sheets

(56) References Cited

U.S. PATENT DOCUMENTS

| | | |
|---|---|---|
| 7,621,718 B1 | 11/2009 | Liang |
| 7,775,769 B1 | 8/2010 | Liang |
| 7,841,828 B2 | 11/2010 | Liang |
| 7,922,451 B1 | 4/2011 | Liang |
| 7,927,073 B2 * | 4/2011 | Scott ............... F01D 5/187 |
| | | 416/193 A |
| 8,545,180 B1 | 10/2013 | Liang |
| 8,727,725 B1 | 5/2014 | Liang |
| 9,243,503 B2 * | 1/2016 | Bunker ............. F01D 5/187 |
| 9,630,277 B2 * | 4/2017 | Lee ................... B23P 6/007 |
| 2002/0197160 A1 * | 12/2002 | Liang ................ F01D 5/18 |
| | | 416/92 |
| 2004/0094287 A1 | 5/2004 | Wang |
| 2005/0089394 A1 | 4/2005 | Lu et al. |
| 2008/0166240 A1 | 7/2008 | Scott et al. |
| 2009/0208325 A1 | 8/2009 | Devore et al. |
| 2013/0312941 A1 * | 11/2013 | Bunker ............. F01D 5/187 |
| | | 165/133 |
| 2017/0145831 A1 | 5/2017 | Bunker |
| 2017/0145921 A1 | 5/2017 | Bunker |
| 2017/0159450 A1 | 6/2017 | Bhuler et al. |
| 2017/0159452 A1 | 6/2017 | Bunker et al. |
| 2017/0167268 A1 | 6/2017 | Bunker |

FOREIGN PATENT DOCUMENTS

| | | |
|---|---|---|
| EP | 3 043 027 A1 | 7/2016 |
| JP | 2014-227914 A | 12/2014 |

OTHER PUBLICATIONS

Machine Translation and First Office Action and Search issued in connection with corresponding CN Application No. 201611115465.7 dated Feb. 5, 2018.

* cited by examiner

GAS TURBINE ENGINE WITH FILLET FILM HOLES

BACKGROUND OF THE INVENTION

Turbine engines, and particularly gas or combustion turbine engines, are rotary engines that extract energy from a flow of combusted gases passing through the engine onto a multitude of rotating turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Gas turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine blades, as well as vanes or nozzles, generally include one or more interior cooling circuits for routing the cooling air through the blade to cool different portions of the blade, and can include dedicated cooling circuits for cooling different portions of the blade, such as the leading edge, trailing edge and tip of the blade.

BRIEF DESCRIPTION OF THE INVENTION

In one aspect, an airfoil for a gas turbine engine comprises an outer wall defining a pressure side and a suction side with the outer wall extending chord-wise from a leading edge to a trailing edge and span-wise from a root to a tip. A cooling passage is located within the airfoil and is at least partially defined by a passage wall intersecting with the outer wall to define a corner of the cooling passage, with the passage wall having a first thickness at the corner and the outer wall having a second thickness at the corner. A fillet is located at the corner and has an effective radius of at least 1.5 times larger than the greater of the first and second thicknesses. At least one film hole, having an effective length L and an effective diameter D, extends through the fillet to fluidly couple the cooling passage to an exterior of the airfoil.

In another aspect, a method of forming a film hole in an airfoil of a gas turbine engine comprises forming a film hole through a fillet of a corner of a cooling passage formed by the intersection of two walls, with the fillet having an effective radius of at least 1.5 times greater than the greater of the thicknesses for the two walls.

In yet another aspect, a component for a gas turbine engine comprises an internal cooling passage at least partially formed by intersecting walls defining a corner, having a fillet with an effective radius of at least 1.5 times the thickness of the thickest of the intersecting walls and at least one film holes extending through the fillet and at least one of the intersecting walls.

DESCRIPTION OF EMBODIMENTS OF THE INVENTION

Figure 1:
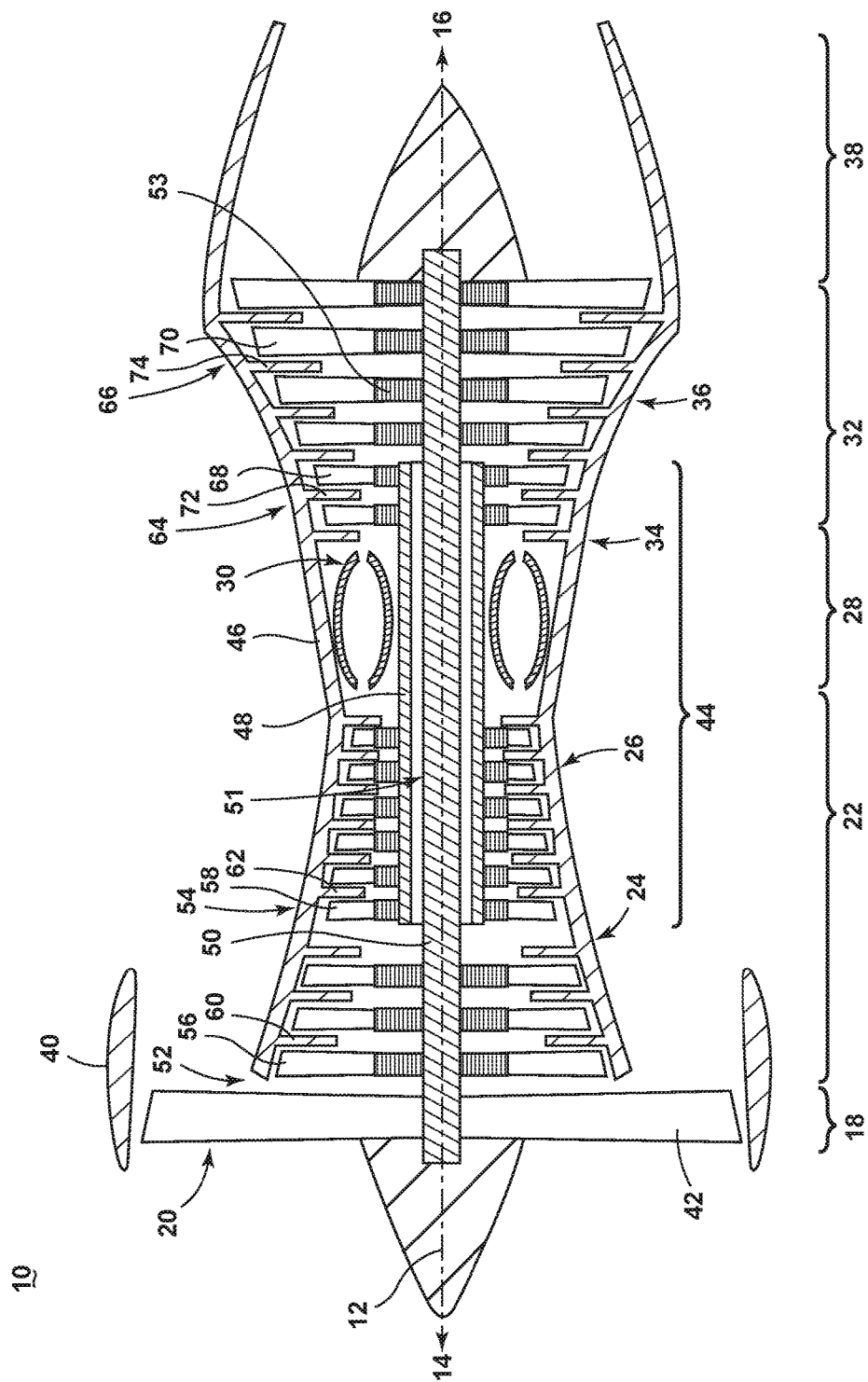
FIG. 1 is a schematic, sectional view of a gas turbine engine.

The described embodiments of the present invention are directed to apparatuses, methods, and other devices related to routing air flow in a turbine engine. For purposes of illustration, the present invention will be described with respect to an aircraft gas turbine engine. It will be understood, however, that the invention is not so limited and can have general applicability in non-aircraft applications, such as other mobile applications and non-mobile industrial, commercial, and residential applications.

It should be further understood that for purposes of illustration, the present invention will be described with respect to an airfoil for a turbine blade of the turbine engine. It will be understood, however, that the invention is not limited to the turbine blade, and can comprise any airfoil structure, such as a compressor blade, a turbine or compressor vane, a fan blade, or a strut in non-limiting examples. Furthermore, the filleted optimization can have uses in additional engine components utilizing film holes or surface film cooling, such as a band, combustor assembly, or platform in non-limiting examples.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

It should be further understood that as used herein, the term 'fillet' is used to describe material that "fills" in a corner formed by a junction of two intersecting walls. It should be further understood that the intersecting walls can be integral and need not comprise separate intersecting elements. Similarly, the fillet can be integral with the intersecting walls. In the case of the fillet being integral to the intersecting walls, there is no clear demarcation between the fillet and the corner. In such a case, the fillet can be identified by virtually extending the wall thickness until the walls intersect to form a virtual corner.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are referred to individually or collectively as a rotor 51.

The LP compressor 24 and the HP compressor 26 respectively include a plurality of compressor stages 52, 54, in which a set of compressor blades 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, with each stage having its own disk. The vanes 60, 62 are mounted to the core casing 46 in a circumferential arrangement about the rotor 51.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26.

Figure 2:
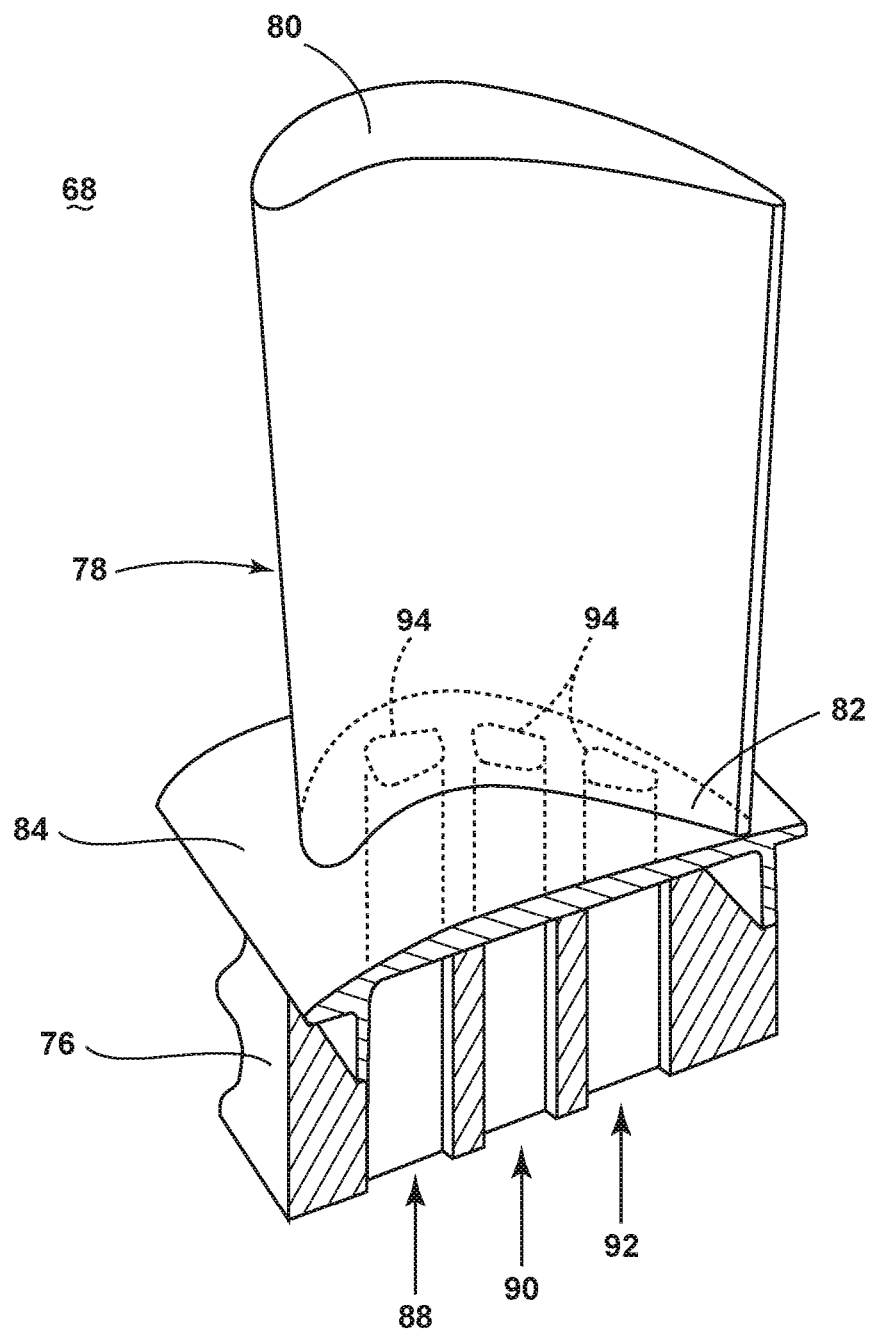
FIG. 2 is a schematic perspective view of an airfoil of the engine of FIG. 1.

FIG. 2 is a perspective view of an engine component in the form of one of the turbine blades 68 of the engine 10 from FIG. 1. The turbine blade 68 includes a dovetail 76 and an airfoil 78. The dovetail 76 can be configured to mount to a turbine rotor disk on the engine 10. The airfoil 78 extends from a tip 80 to a root 82 defining a span-wise direction. The dovetail 76 further includes a platform 84 integral with the airfoil 78 at the root 82, which helps to radially contain the turbine airflow. The dovetail 76 comprises at least one inlet passage, exemplarily shown as a first inlet passage 88, a second inlet passage 90, and a third inlet passage 92, each extending through the dovetail 76 to provide internal fluid communication with the airfoil 78 at a passage outlet 94. The inlet passages 88, 90, 92 as shown are exemplary should not be understood as limiting. More or less inlet passages can be used to provide a flow of fluid internal of the airfoil 78. It should be appreciated that the dovetail 76 is shown in cross-section, such that the inlet passages 88, 90, 92 are housed within the body of the dovetail 76. It should be further appreciated that the embodiments as described herein are related to an airfoil 78, however, this should not be construed as limiting of the invention and additional engine components such as a blade, vane, strut, or shroud assembly, in non-limiting examples, can be substituted for the airfoil.

Figure 3:
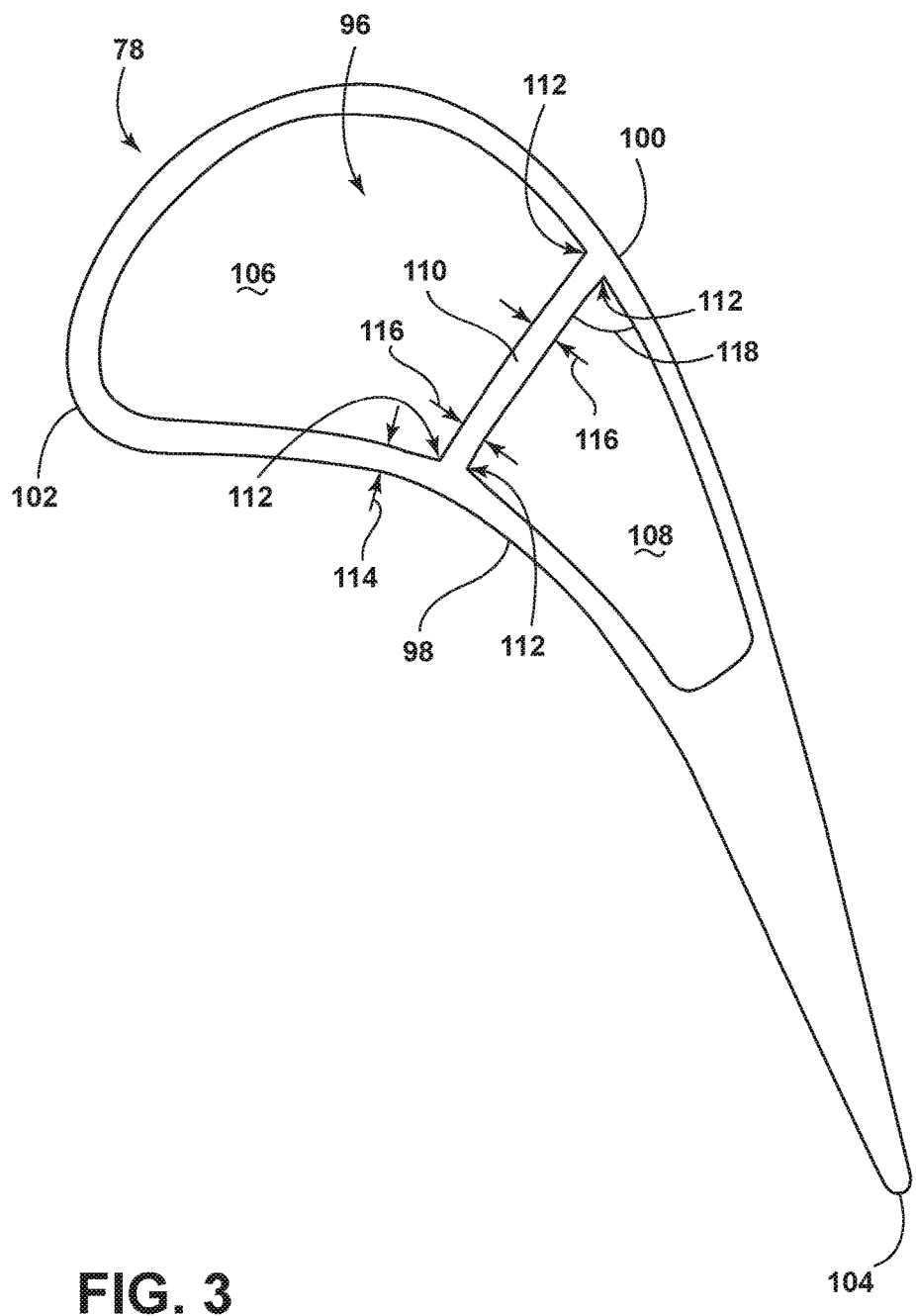
FIG. 3 is a cross-sectional view of the airfoil of FIG. 2 illustrating internal cooling passages.

Turning to FIG. 3, the airfoil 78, shown in cross-section, has an outer wall defining a concave-shaped pressure wall 98 and a convex-shaped suction wall 100 which are joined together to define an airfoil shape. A leading edge 102 and a trailing edge 104 define a chord-wise direction extending therebetween. The airfoil 78 rotates in a direction such that the pressure wall 98 follows the suction wall 100. Thus, as shown in FIG. 3, the airfoil 78 would rotate upward toward the top of the page.

The airfoil 78 comprises an interior 96 having a plurality of cooling passages, exemplarily shown as a first passage 106 and a second cooling passage 108, separated by a passage wall 110 disposed between the passages 106, 108.

The cooling passages 106, 108 can comprise a symmetrical cross section, or alternatively, can comprise an asymmetrical cross-section. A plurality of corners 112 can be defined at the junctions between the passage wall 110 and the pressure and suction walls 98, 100. While the corners 112 are shown as sharp corners having a defined point, it should be appreciated that they are not so limited. For example, the corners 112 can be slightly rounded, or otherwise, such that a virtual corner can be defined. It should be further appreciated that the rounded corners are not equivalent to the fillets described herein. The fillets define an increased thickness, while the slightly rounded corner can be nominal. The pressure wall 98 and suction wall 100 can have a first thickness 114, and the passage wall 110 can have a second thickness 116, the thicknesses 114, 116 being defined adjacent the corners 112. The thicknesses 114, 116 can be the cross-sectional width of the respective walls. It should be appreciated that the respective geometries of each cooling passages 106, 108 within the airfoil 78 as shown is exemplary and should not limit the airfoil 78 to the geometries, dimensions, or positions as shown.

A corner angle 118 can be defined at each corner 112. The intersecting walls to define the corner 112 can intersect in a manner which defines an acute, right, or obtuse angle 118 for the corner 112. Additionally, one or more of the intersecting walls can be angled or arcuate, such that the corner 112 comprises an increasing cross-sectional distance extending from the corner 112 at the junction between the two walls.

Figure 4:
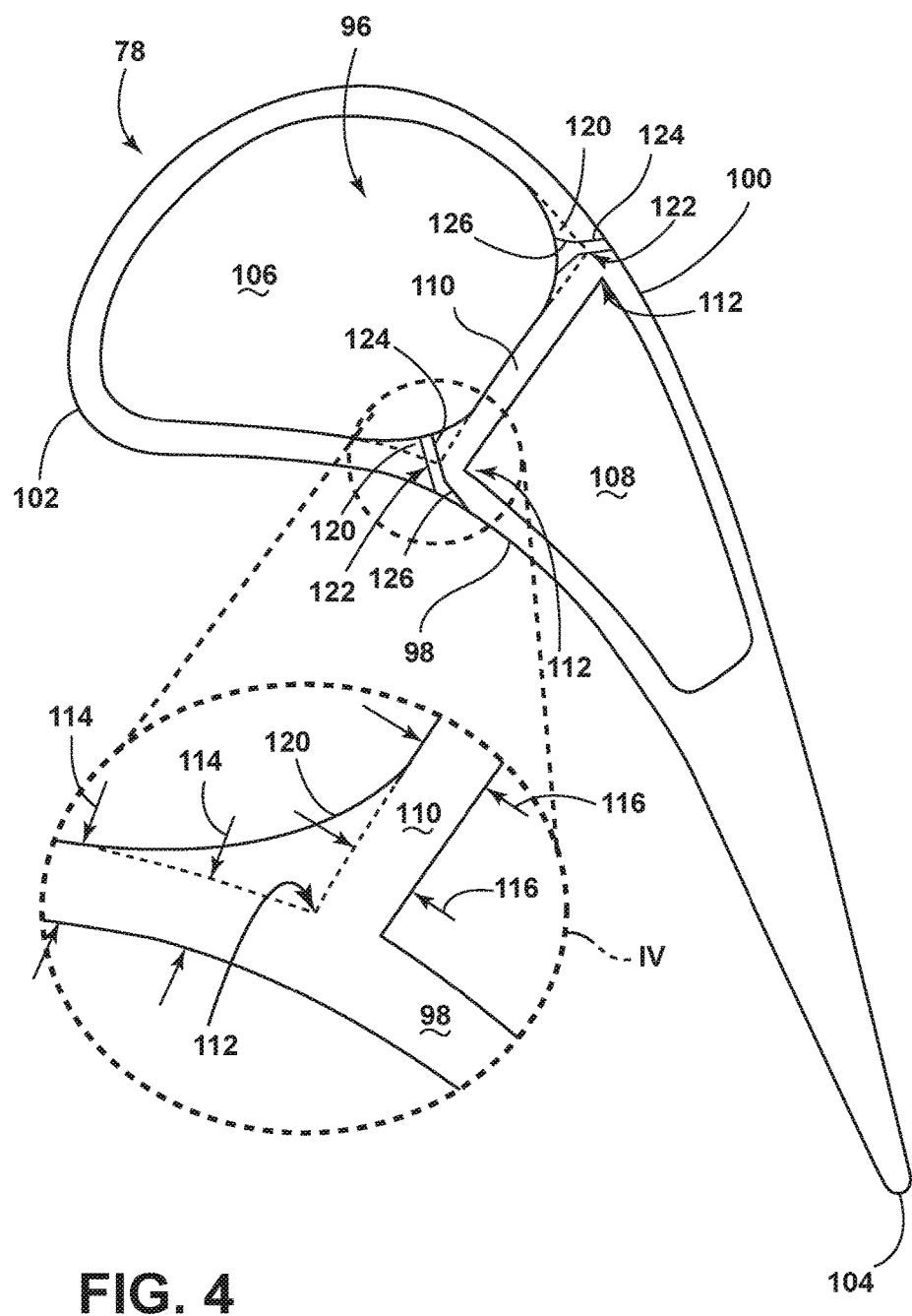
FIG. 4 is a cross-sectional view of FIG. 3 having fillets located at the corners of the cooling passages.

Turning now to FIG. 4, the first passage 106 comprises fillets 120, which are demarcated from the walls 98, 100, 110 by the dashed lines. The fillets 120 have a thickness extending outwardly from the dashed line representing 114, 116. The fillets 120 comprise an increased thickness at the corners 112 relative to the wall thicknesses 114, 116. One or more film holes 122 extend from the first passage 106 to the external surface of the airfoil 78 through the fillets 120. The film holes 122 comprise a first portion 124 and a second portion 126. The portions 124, 126 are representative of a compound angle for the film holes 122.

The compound angle of the film holes can be defined as having both an axial component and a radial component relative to the engine centerline 12. Thus, it can be understood that although the film holes 122 are shown in cross-section being substantially axial, i.e. parallel to the engine centerline 12, the film holes 122 can also extend in a radial direction relative to the engine centerline 12, or a combination of axial and radial. The first and second portions 124, 126 as illustrated, can be understood as contemplating the radial or axial components being adjacent to either internal or external of the airfoil 78. Furthermore, the film holes 122 can be non-linear, defining at least a portion of an arcuate profile. The film holes 122 as illustrated are exemplary and should be understood as non-limiting, having any combination of radial and axial components.

Looking specifically at the close-up section IV, having the film hole 122 removed for illustrative purposes, it should be understood that the fillets 120 are a material filling the corner 112 at a junction of intersecting walls, defining an increased thickness. The increased thickness can be defined against the virtual extensions of the walls 98, 110, shown in dashed line, such that the walls 98, 110 at the fillet 120 have an increased thickness being greater than the thicknesses 114, 116 of the respective walls 98, 100. It should be understood that the fillets 120 need not comprise added material, but can be integral with at least one of the walls 98, 100, 110, and can define a thickness against the virtual extensions of the walls 98, 110 adjacent the fillet 120. It should be further appreciated that the virtual extensions of the walls 98, 110 illustrated in dashed line are for illustrative purposes, providing the reader with a means of visual comparison of the thickness of the fillet 120 against the wall thicknesses 114, 116, and such an extension of the walls adjacent the fillet 120 is not required.

Figure 5:
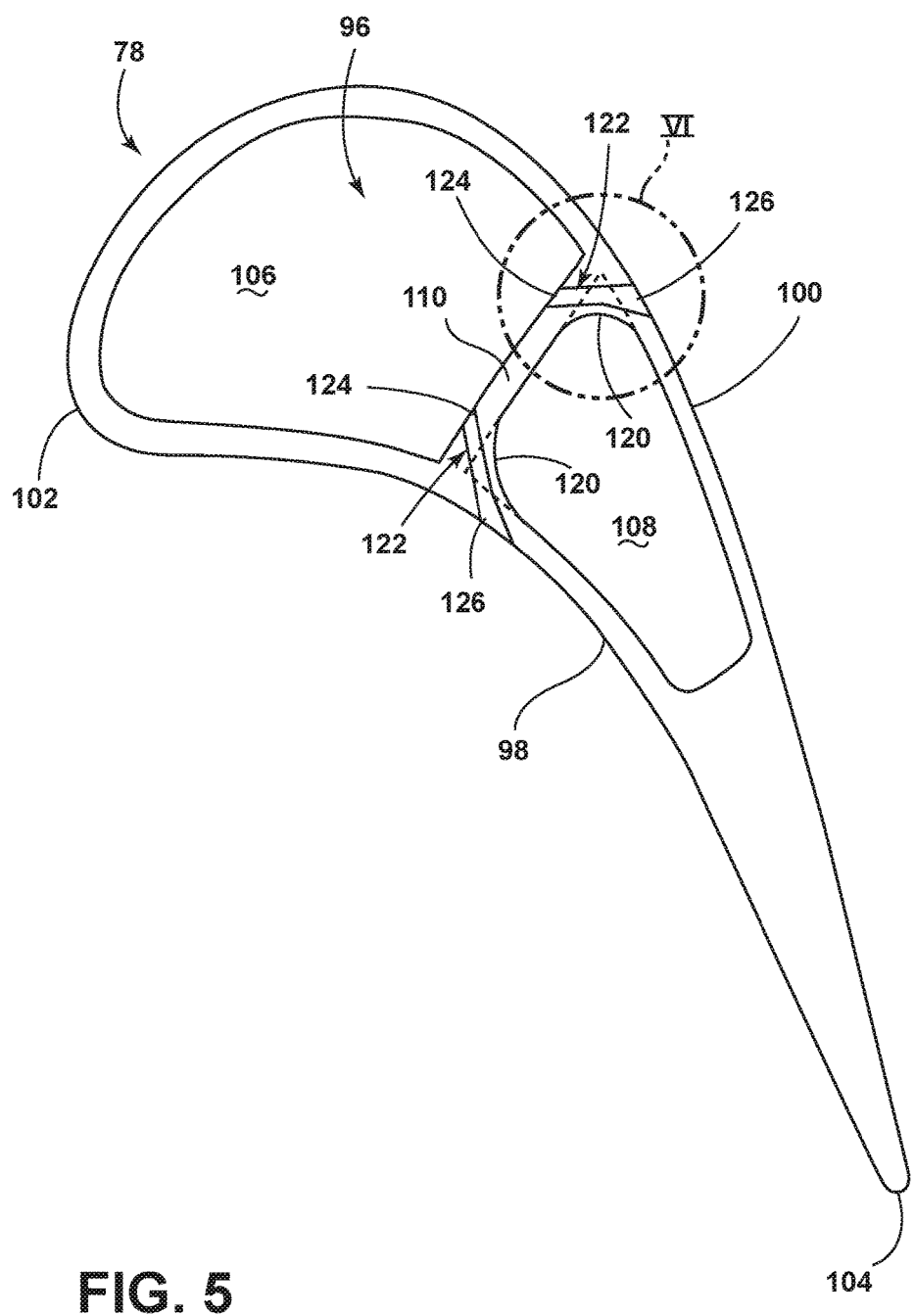
FIG. 5 is a cross-sectional view of FIG. 3 having fillets within the corners of another internal passage.

In FIG. 5, as compared to FIG. 4, the fillets 120 are disposed on the corners 112 of the second cooling passage 108. The film holes 122 extend from the first cooling passage 106, through the passage wall 110 and the fillets 120, and out the pressure and suction walls 98, 100. In this version, the film holes 122 are not restricted to being compound. They can be axial, radial, linear, or compound, or arcuate, etc. Furthermore, the cooling passage 106 can still have fillets 120, but the inlets of the film holes 122 are disposed on the non-fillet portion.

Figure 6:
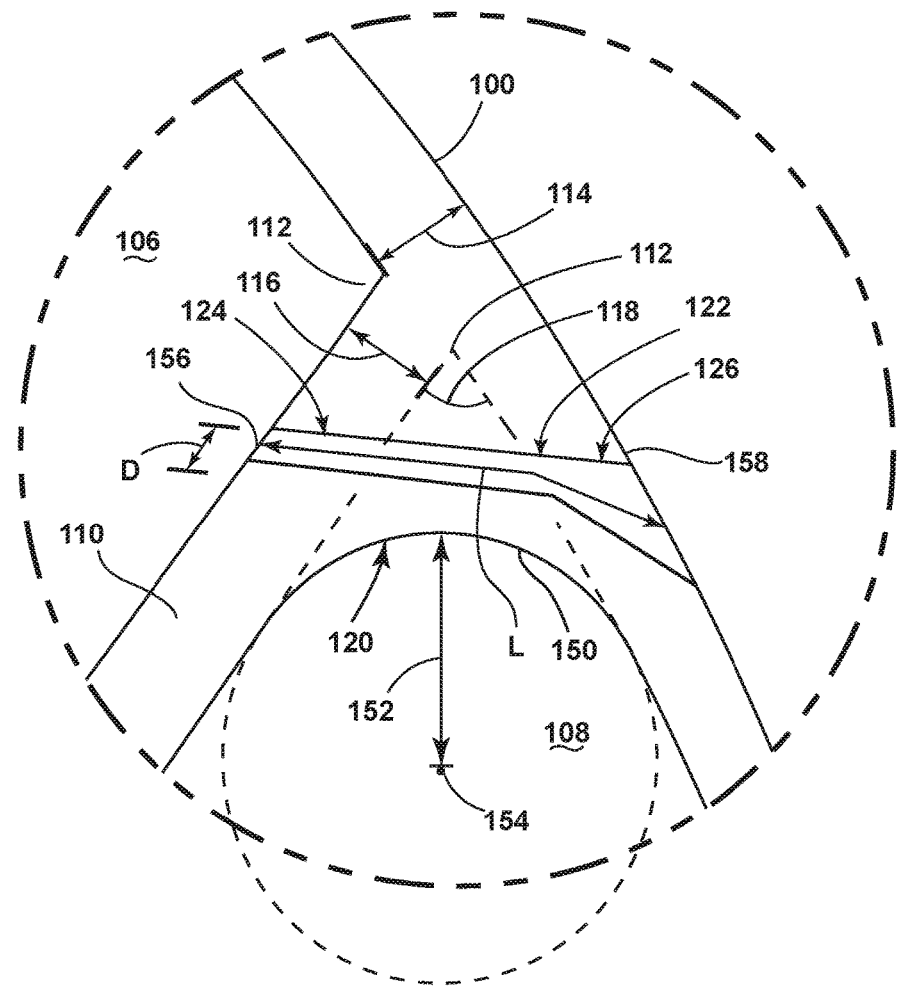
FIG. 6 is a close-up view of the fillets of FIG. 5 illustrating a fillet effective radius.

In FIG. 6, the fillet 120 disposed within the second cooling passage 108 can define at least a portion of a circle or an arcuate surface, such that an effective radius 152 is defined between the fillet 120 and a center point 154 of the circle 150. Alternatively, the fillet 120 could be defined as a compound fillet, having discrete arcuate or linear surfaces defining the fillet 120. The fillet 120 comprises a thickness extending between the corner 112, shown in dashed line, and the arcuate surface 150. A length L can be defined as the length between an inlet 156 and an outlet 158 of the film holes 122 and a diameter D can be defined as the cross-sectional width of the film hole 122. The length can be determined as the distance between the inlet 156 and the outlet 158 through the center of the film hole 122 where the centerline intersects the airfoil surface. As such, the film hole 122 can be defined by the length-to-diameter ratio, L/D. While the film holes 122 are illustrated as having an increasing cross-sectional area at the second portion 126, it should be understood that the film holes 122 can comprise a consistent diameter D and cross-sectional area, with the second portion 126 only being exemplary of the compound angle of the film holes 122. Similarly, the compound disposition of the length L is exemplary of the compound film hole 122, and it should be understood that the length L can be measured along a centerline of the film hole 122 between the inlet and outlet 156, 158 at the respective surfaces. Thus, the centerline of the film hole 122 can be straight, curved, arcuate, jointed, etc. in non-limiting examples.

The fillet 120 is shaped such that the effective radius 152 is at least 1.5 times larger than the greater of the first or second thickness 114, 116, and can be as great as 10.0 times the greater of the thicknesses 114, 116. Alternatively, the shape and size of the fillet 120 can adapted to increase the length L of the film holes 122, which would otherwise pass through the second cooling passage 108. Increasing the length L of the film holes 122 increases the value for the L/D ratio. Furthermore, the angle 118 defined by the corner 112 can provide for an increased or decreased effective radius 152. For example, the filleted corner 112, as illustrated, is acute providing for an effective radius 152 of approximately 1.5-2.0 times the larger of the thicknesses 114, 116. In alternative corners 112 where the angle 118 is obtuse, for example, the fillet 120 can define an effective radius which can be about 4.0 times the thicknesses 114, 116, or more. As such, it should be understood that the effective radius 152 for the fillet 120 can be between 1.5 and 10.0 times the thicknesses 114, 116 of the walls 100, 110 defining the corner 112, which can be determined by the angle 118 of the corner 112.

It should be appreciated that the circle 150 defined by the fillet 120 is exemplary. The fillet 120 need not be shaped such that fillet 120 defines the circle 150. The fillet 120 can be any arcuate shape or segment thereof, such that a radius or local radius can define the effective radius. The fillet 120 can be a non-circular arc, such that a segment of the arc or at least a portion of the fillet 120 can define a local radius to comprise the effective radius 152. Additionally, when utilizing a compound radius of curvature defined by the fillet 120, the average overall radius could be used to determine the effective radius 152.

Figure 7:
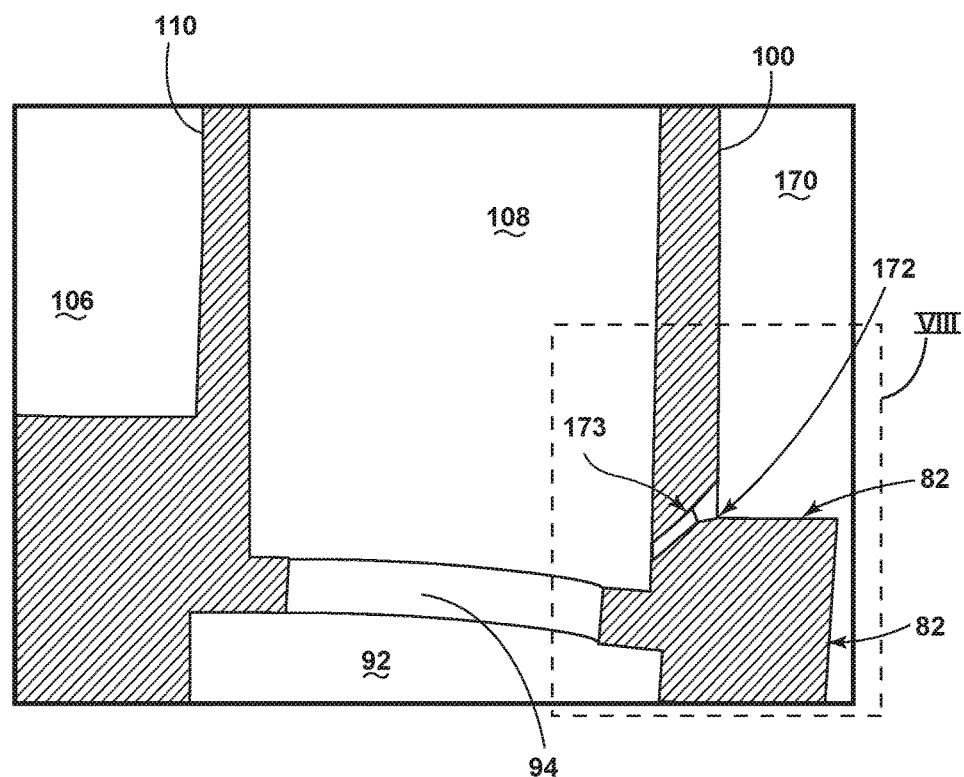
FIG. 7 is a close-up cross-sectional view of the airfoil of FIG. 2 illustrating the root of the airfoil.

Turning to FIG. 7, a section of the airfoil 78 at the root 82 illustrates an external corner 172 of the airfoil 78. The first and second cooling passages 106, 108 are illustrated internal of the airfoil 78, with the second cooling passage 108 adjacent to the suction wall 100 in fluid communication with the third internal passage 92 at the passage outlet 94. An external volume 170 is defined external to the airfoil 78 at the suction wall 100, being in fluid communication with the second cooling passage 108 through a film hole 173.

Figure 8A:
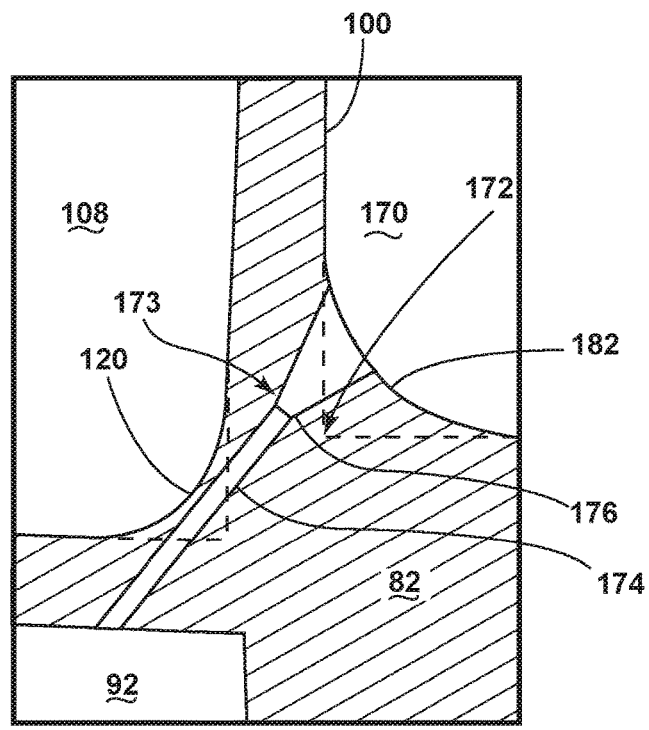
FIGS. 8A and 8B are close-up views of the section of FIG. 7 illustrating both internal and external fillets.
Figure 8B:
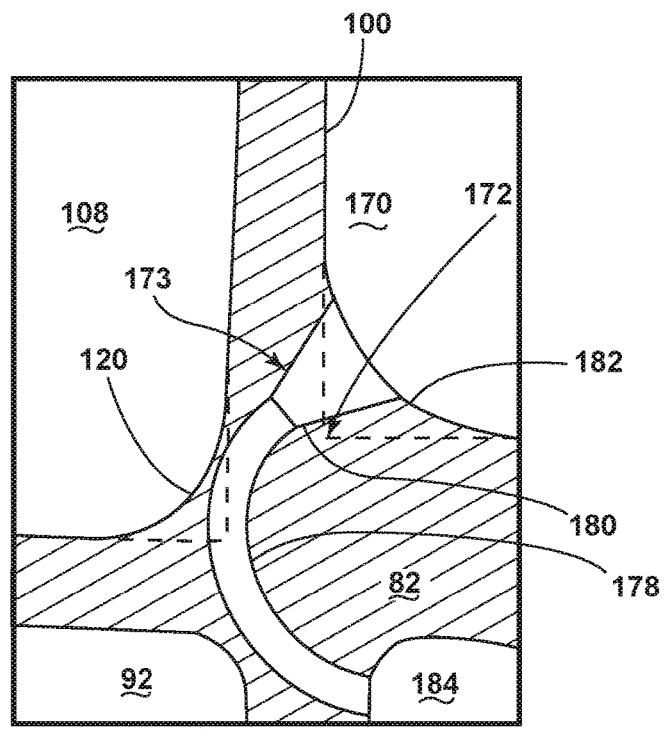

Turning now to FIGS. 8A and 8B, the external corner 172 comprises an external fillet 182. In FIG. 8A the external fillet 182 is used in combination with the internal fillet 120 in the second cooling passage 108. The fillets 120, 182 provide an increased thickness such that the length L of the compound film hole 173, comprising both cylindrical 174 and diffusing 176 components, can be increased to define a greater value of L/D for the film hole 173. Similarly, in FIG. 8B, a third internal passage 184 can utilize the fillet 120, 182 to define an increased thickness portion such that an arcuate portion 178 coupling to a linear portion 180 of the film hole 173 can be disposed within the walls of the airfoil 78.

Figure 9:
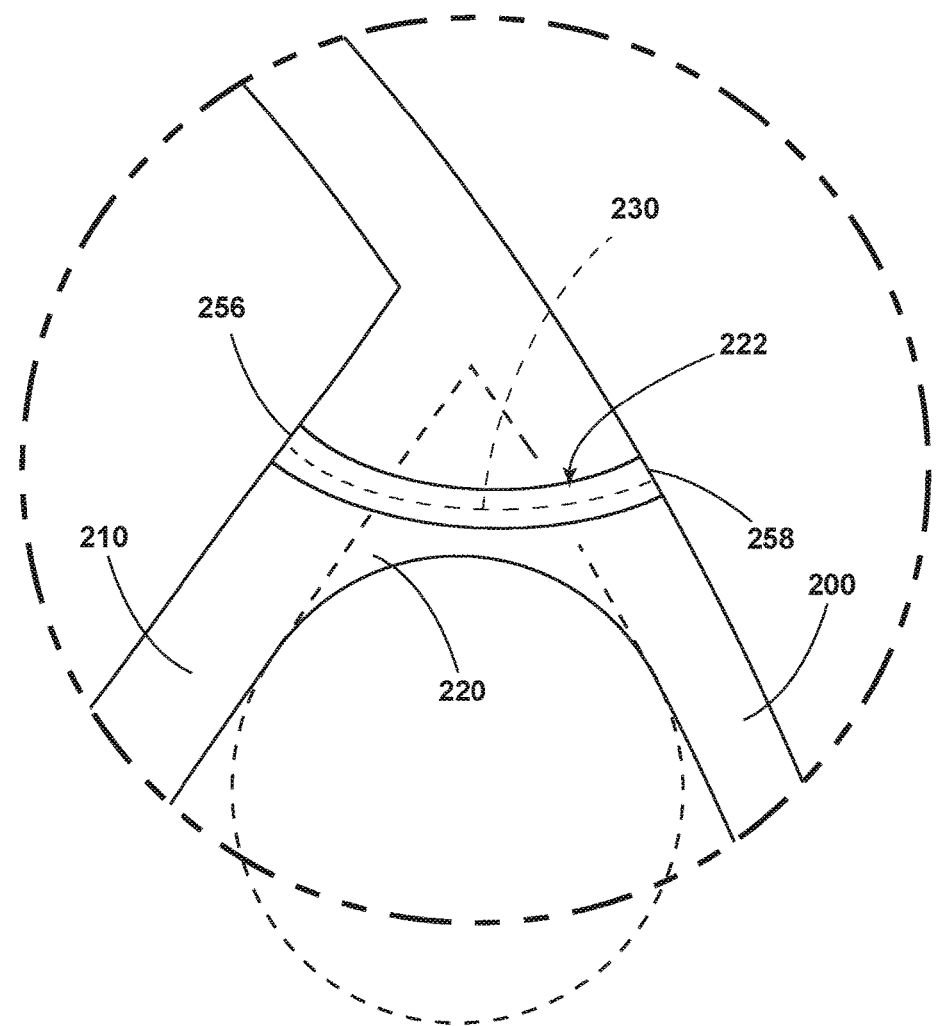
FIG. 9 is a close-up view of the fillets of FIG. 5 with a film hole having a non-linear, arcuate centerline.

Referring now to FIG. 9, a film hole 222 can extend through a passage wall 210, a fillet 220 and through an outer wall 200 similar to that of FIG. 6. An inlet 256 for the film hole 222 can be provided on the passage wall 210 and an outlet 258 can be provided on the exterior surface of the outer wall 200. The film hole 222 can define a non-linear arcuate, centerline 230.

It should be appreciated that the filleted surfaces, being internal or external, increase the L/D values for compound shaped cooling holes by locally increasing both the internal and external fillet radius through which the hole penetrates. The increased values for L/D provide for increased cooling hole effectiveness. The fillets can minimally increase overall system weight without thickening an entire wall or surface. Furthermore, the fillets provide for an increase in structural support. Further still, the fillets accommodate film hole inlet or exit shaping, as well as non-linear geometries. As such, exit shaping should be understood as any shape other than a standard round inlet or exit.

The film holes can be in a wall surface or a fillet surface and penetrate through at least a portion of the fillet, permitting an increased length for the film hole otherwise impossible to achieve without the fillet. Furthermore, the fillets can be compounded, such as filleted internal surfaces or the combination in external and internal surfaces to further increase the length to achieve greater L/D values.

It should be further appreciated that the fillets provide for an increased length providing the potential for a wider range of film holes, such as curved film holes, "S-curved" film holes as well as other orientations beyond a standard straight or compound film hole with increased effectiveness.

It should be understood that while the embodiments as described herein relate to an airfoil, the filleted corners can be utilized in additional engine components having intersecting walls to define a corner and utilizing film holes or cooling at or near those corners of the engine components.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a gas turbine engine, the airfoil comprising:
   an outer wall defining an interior and including a pressure side and a suction side, the outer wall having a first thickness and extending chord-wise from a leading edge to a trailing edge and span-wise from a root to a tip;
   a passage wall intersecting with the outer wall, effectively separating the interior into a first cooling passage and a second cooling passage with the passage wall defining a first corner of the first cooling passage and a second corner of the second cooling passage, with the passage wall having a second thickness;
   a fillet located at the second corner; and
   at least one film hole having a length, L, and diameter, D, an inlet located on the passage wall, and an outlet located on the outer wall, and extending from the first cooling passage through the passage wall and the fillet to fluidly couple the first cooling passage to an exterior of the airfoil.

2. The airfoil according to claim 1 wherein a length to diameter ratio, L/D, of the at least one film hole is greater than 2.

3. The airfoil according to claim 1 wherein the airfoil is one of a rotating blade or a stationary vane.

4. The airfoil according to claim 1 wherein an effective radius of the fillet is at least 2.0 times larger than the greater of the first and second thicknesses.

5. The airfoil according to claim 4 wherein the effective radius is greater than 4.0 times the thickness of the greater of the first and second thicknesses.

6. The airfoil according to claim 5 wherein the effective radius is less than 10.0 times larger than the greater of the first and second thicknesses.

7. The airfoil according to claim 6 further comprising an angle defined by the second corner wherein the angle determines the effective radius.

8. The airfoil according to claim 7 wherein the at least one film hole extends through the outer wall.

9. The airfoil according to claim 8 wherein the fillet is located internally of the airfoil.

10. The airfoil according to claim 1 wherein the first cooling passage has one to three corners.

11. The airfoil according to claim 1 wherein the first cooling passage has one to two corners.

12. The airfoil according to claim 1 wherein the at least one film hole is linear.

13. The airfoil according to claim 1 wherein the at least one film hole defines a non-linear, arcuate centerline.

14. The airfoil according to claim 1 further comprising a second fillet located external to the airfoil adjacent the outer wall.

15. The airfoil according to claim 1 wherein the fillet is internal to the airfoil.

16. The airfoil according to claim 1 wherein the inlet of the at least one film hole is spaced from the outer wall.

17. A method of forming a film hole in an airfoil of a gas turbine engine having an outer wall defining an interior and a passage wall extending from the outer wall into the interior with a fillet at a corner defined at a junction of the outer wall and the passage wall and positioned within the interior, the method comprising forming the film hole with an inlet provided on the passage wall and an outlet provided on the outer wall, and extending through the passage wall and the fillet.

18. The method of claim 17 wherein an effective radius of the fillet is greater than 2.0 times a thickness of the greater of a thickness for the outer wall or the passage wall.

19. The method of claim 18 wherein the effective radius is greater than 4.0 times the thickness of the greater of the thickness for the outer wall or the passage wall.

20. The method of claim 18 wherein the effective radius is less than 10.0 times the thickness of the greater of the thickness for the outer wall or the passage wall.

21. The method according to claim 17 wherein the forming further comprises forming the inlet spaced from the outer wall.

22. A component for a gas turbine engine comprising an outer wall at least partially defining an internal cooling passage with a passage wall extending from the outer wall into the internal cooling passage defining a corner at the outer wall, having a fillet formed at the corner and within the internal cooling passage, and at least one film hole extending through the fillet and both of the outer wall and the passage wall.

23. The component according to claim 22 wherein an effective radius of the fillet is greater than 2.0 times a thickness of the thicker of the outer wall or the passage wall.

24. The component according to claim 23 wherein the effective radius is greater than 4.0 times the thickness of the thicker of the outer wall or the passage wall.

25. The component according to claim 23 wherein the effective radius is less than 10.0 times the thickness of the thicker of the outer wall or the passage wall.

26. The component according to claim 22 wherein the at least one film hole includes an inlet on the passage wall spaced from the outer wall.

* * * * *